US010061970B2

(12) United States Patent
Zhou

(10) Patent No.: US 10,061,970 B2
(45) Date of Patent: *Aug. 28, 2018

(54) METHOD FOR CONTROLLING UNLOCKING AND MOBILE TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,445

(22) Filed: Dec. 14, 2017

(65) Prior Publication Data

US 2018/0107860 A1     Apr. 19, 2018

Related U.S. Application Data

(63) Continuation of application No. 15/601,659, filed on May 22, 2017.

(30) Foreign Application Priority Data

May 30, 2016  (CN) .......................... 2016 1 0375834

(51) Int. Cl.
G06K 9/00     (2006.01)
G03B 7/00     (2014.01)

(52) U.S. Cl.
CPC ..... G06K 9/00087 (2013.01); G06K 9/00013 (2013.01); G06K 9/00067 (2013.01)

(58) Field of Classification Search
CPC ........... G06K 9/00087; G06K 9/00013; G06K 9/00067

(Continued)

(56) References Cited

U.S. PATENT DOCUMENTS 6,011,859 A * 1/2000 Kalnitsky .......... G06K 9/00053
                                                  382/100
6,817,130 B2 * 11/2004 Ivanov .................... F41A 17/20
                                                  382/121

(Continued)

FOREIGN PATENT DOCUMENTS

CN      102004592 A     4/2011
CN      102609204 A     7/2012

(Continued)

OTHER PUBLICATIONS

Jea et al., A minutia-based partial fingerprint recognition system[J], "Pattern Recognition", Oct. 1, 2005, 38(10):1672-1684.

(Continued)

Primary Examiner — Kathleen Y Dulaney
(74) Attorney, Agent, or Firm — Young Basile Hanlon & MacFarlane, P.C.

(57) ABSTRACT

A method and a mobile terminal for controlling unlocking include the following. The number of feature points in a current feature point set of a finger is acquired. X rows of sensing electrodes are added to the current sensing electrode set to update the current sensing electrode set. The finger is scanned according to sensing electrodes in the current sensing electrode set updated to obtain fingerprint data. A fingerprint image is generated based on the fingerprint data. Feature points are extracted from the fingerprint image and the current feature point set is updated based on the feature points extracted. The terminal is unlocked when the number of the feature points in the current feature point set is greater than or equal to the first preset threshold and the current feature point set is matched.

17 Claims, 6 Drawing Sheets

(58) Field of Classification Search
USPC ............ 382/118, 124, 318; 348/E3.018, 362
See application file for complete search history.

(56) References Cited

U.S. PATENT DOCUMENTS

| | | | |
|---|---|---|---|
| 6,879,344 B1* | 4/2005 | Nakamura | H04N 5/2351 348/221.1 |
| 7,738,704 B2* | 6/2010 | Lienhart | G06F 17/30802 348/E7.036 |
| 2002/0181749 A1* | 12/2002 | Matsumoto | G06K 9/00006 382/125 |
| 2003/0035571 A1* | 2/2003 | Haselsteiner | G06K 9/00013 382/124 |
| 2003/0156744 A1* | 8/2003 | Hashimoto | G06K 9/00013 382/124 |
| 2008/0075332 A1* | 3/2008 | Fujisawa | G06K 9/00013 382/115 |
| 2008/0199057 A1* | 8/2008 | Hsieh | G06K 9/00026 382/125 |
| 2008/0226132 A1 | 9/2008 | Gardner | |
| 2011/0279664 A1* | 11/2011 | Schneider | G06K 9/0002 348/77 |
| 2014/0093143 A1* | 4/2014 | Thompson | G06K 9/00033 382/124 |
| 2014/0270413 A1* | 9/2014 | Slaby | G06F 3/0488 382/124 |
| 2015/0047017 A1* | 2/2015 | Kim | G06F 21/32 726/19 |
| 2015/0063661 A1* | 3/2015 | Lee | G06F 3/011 382/124 |
| 2015/0269409 A1* | 9/2015 | Weber | G06F 3/044 382/125 |
| 2016/0148037 A1 | 5/2016 | Baek et al. | |
| 2016/0253539 A1* | 9/2016 | Shen | G01B 7/28 382/124 |

FOREIGN PATENT DOCUMENTS

| | | |
|---|---|---|
| CN | 105022984 A | 11/2015 |
| CN | 105389566 A | 3/2016 |
| WO | 2015073413 A1 | 5/2015 |

OTHER PUBLICATIONS

Chan et al., Fast fingerprint verification using subregions of fingerprint images[J], "Circuits & Systems for Video Technology IEEE Transactions on", Jan. 1, 2004, 14(1):95-101.
Extended European search report issued in corresponding European application No. 17169801.2 dated Oct. 9, 2017.

* cited by examiner

METHOD FOR CONTROLLING UNLOCKING AND MOBILE TERMINAL

CROSS-REFERENCE TO RELATED APPLICATION(S)

This application is a continuation of U.S. patent application Ser. No. 15/601,659, filed on May 22, 2017, which claims priority to Chinese Patent Application No. 201610375834.X, filed on May 30, 2016, the contents of both of which are hereby incorporated by reference in their entireties.

TECHNICAL FIELD

The present disclosure relates to the technical field of mobile terminals, and particularly to a method for controlling unlocking and a mobile terminal.

BACKGROUND

Fingerprints refer to prints formed by uneven skins on human finger pulps at ends of human fingers. Human fingerprints are subjected to genetic and environmental interaction, and also closely related to the human health, so everyone has fingerprints, but the fingerprints are different. Because the repetitive rates of the fingerprints are very low, which is about one in 15 billion, the fingerprints are so-called "human identity cards". Based on such feature, the fingerprints are widely used as identity authentication information.

For example, a fingerprint identification technology has become a standard configuration for flagship models of mainstream mobile terminal manufacturers. A fingerprint identification process includes feature extracting, data saving, and image matching. After an original image of the human fingerprint is read through a fingerprint identification sensor, the image is matched with a pre-saved registered fingerprint template firstly, and then the mobile terminal is unlocked after the matching is successful.

The unlocking speed directly affects the efficiency of the user for using a device. The unlocking speed has become a major product competition highlight of various manufacturers. Therefore, how to reduce the unlocking time to improve the unlocking efficiency is an important research field.

BRIEF DESCRIPTION OF THE DRAWINGS

To better illustrate the technical solution of implementations of the present disclosure or the technical solution of the present technology, the following descriptions will briefly illustrate the accompanying drawings described in the implementations or the present technology. Obviously, the following described accompanying drawings are some implementations of the present disclosure. Those skilled in the art can obtain other accompanying drawings according to the described accompanying drawings without creative efforts.

DETAILED DESCRIPTION

In order to make a better understanding of technical solutions of the present disclosure by those skilled in the art, the technical solutions of implementations of the present disclosure will be described clearly and completely in combination with the accompanying drawings of the implementations of the present disclosure. Obviously, the described implementations are merely a part of implementations of the present disclosure, and not all of the implementations. All other implementations obtained by those skilled in the art without creative efforts based on the implementations of the present disclosure shall fall within the protection scope of the present disclosure.

Terms "first", "second", "third", "fourth", and so on used in the specification, appended claims, and accompanying drawings of the present disclosure are used to distinguish different objects rather than describe specific sequences. Additionally, terms "include", "have", and any deformation thereof are intended to cover non-exclusive inclusion relationship. For example, a process, method, system, product, or device including a series of steps or units is not limited to listed steps or units, and In at least one alternative implementation, can include steps or units which are not listed, or In at least one alternative implementation, can further include other inherent steps or units for the process, method, product, or device.

The "implementations" mentioned herein means that particular features, structures, or characteristics described with reference to the implementations may be included in at least one implementation of the disclosure. Phrases appearing at various positions of the specification neither always refer to the same implementation, nor separate or alternative implementations that are mutually exclusive with other implementations. It is explicitly and implicitly understood by those skilled in the art that the implementations described herein may be combined with other implementations.

Figure 7:
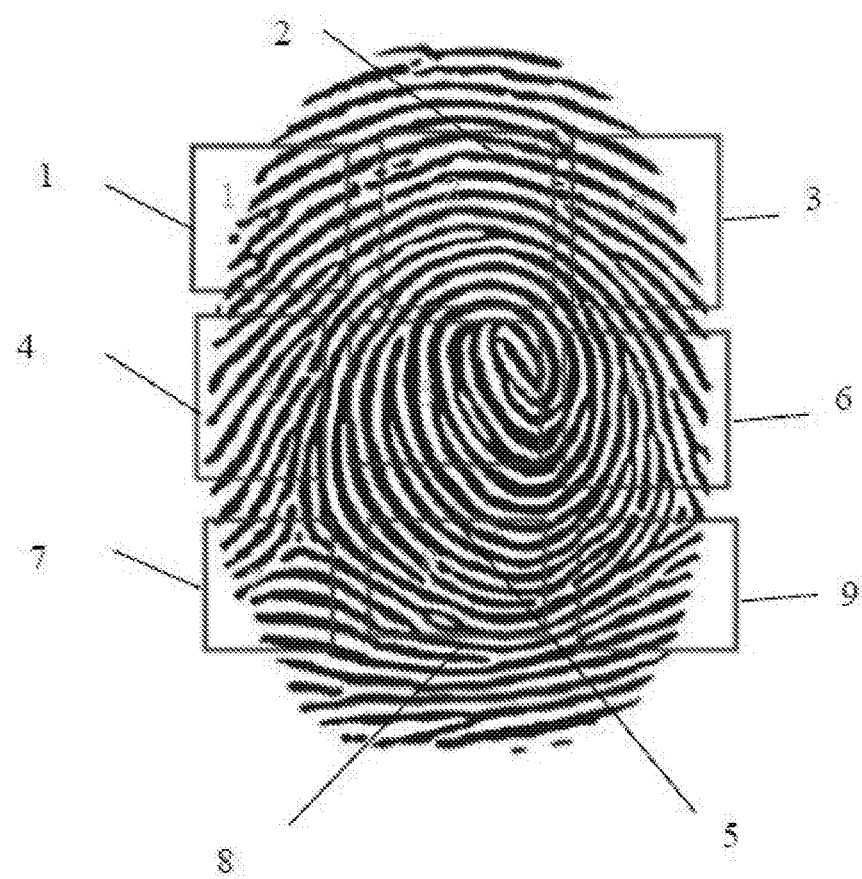
FIG. 7 is a schematic diagram illustrating an example of a fingerprint template.

In the present disclosure, the term "fingerprint template" means that, when a fingerprint function of a terminal such as a mobile phone is enabled for the first time, the user may be asked to undergo a fingerprint registration process. During the fingerprint registration, the user puts his or her finger on a fingerprint sensor (also known as a fingerprint identification module, a fingerprint identification sensor, and the like) for fingerprint image reception, and fingerprint feature information of the received fingerprint images will be extracted to form a fingerprint template, usually, one finger corresponds to one fingerprint template. Generally, the fingerprint sensor may receive 10-20 times for each finger in order to receive the whole fingerprint face and generate a comprehensive fingerprint template. FIG. 7 illustrates an exemplary fingerprint template, and each number marked in the fingerprint of FIG. 7 refers to fingerprint feature information.

In the following, when we refer to "receive" or "receiving" fingerprint image or fingerprint data, it means that a mobile terminal or a fingerprint recognition sensor of the mobile terminal or other related components of the mobile terminal can acquire, collect, obtain or in other manners to get the fingerprint image or fingerprint data. The present disclosure is not limited thereto.

The present disclosure relates to a method for controlling unlocking. The method may include the follows. The number of feature points in a current feature point set of a user finger is acquired. The current feature point set is formed by scanning the user finger through a sensing electrode set. The sensing electrode set includes sensing electrodes from the $([M/2]-k11)^{th}$ to the $([M/2]+k12)^{th}$ row in a sensing electrode array of M rows and N columns, the sensing electrode array is arranged in a fingerprint identification sensor of a mobile terminal, and M, N, k11, and k12 are positive integers. The mobile terminal is unlocked when the number of the feature points in the current feature point set is greater than or equal to a first preset threshold and the current feature point set matches with a pre-saved fingerprint template.

The present disclosure further relates to a mobile terminal to execute the method for controlling unlocking. The terminal illustrated in the implementations of the present disclosure may include a smartphone, a tablet computer, a palmtop computer, a laptop computer, a mobile internet device (MID) or a wearable device. The terminal in the present disclosure can also include an automated teller machine (ATM), a ticket machine, an entrance guard machine, medical equipment, and other terminal equipped with fingerprint recognition function. The foregoing terminal is only exemplary rather than exhaustive. The present disclosure is not limited to the foregoing terminal.

In order to better understand the method for controlling unlocking and the mobile terminal disclosed in the implementations of the disclosure, the implementations of the disclosure will be described in detail hereinafter.

Figure 1:
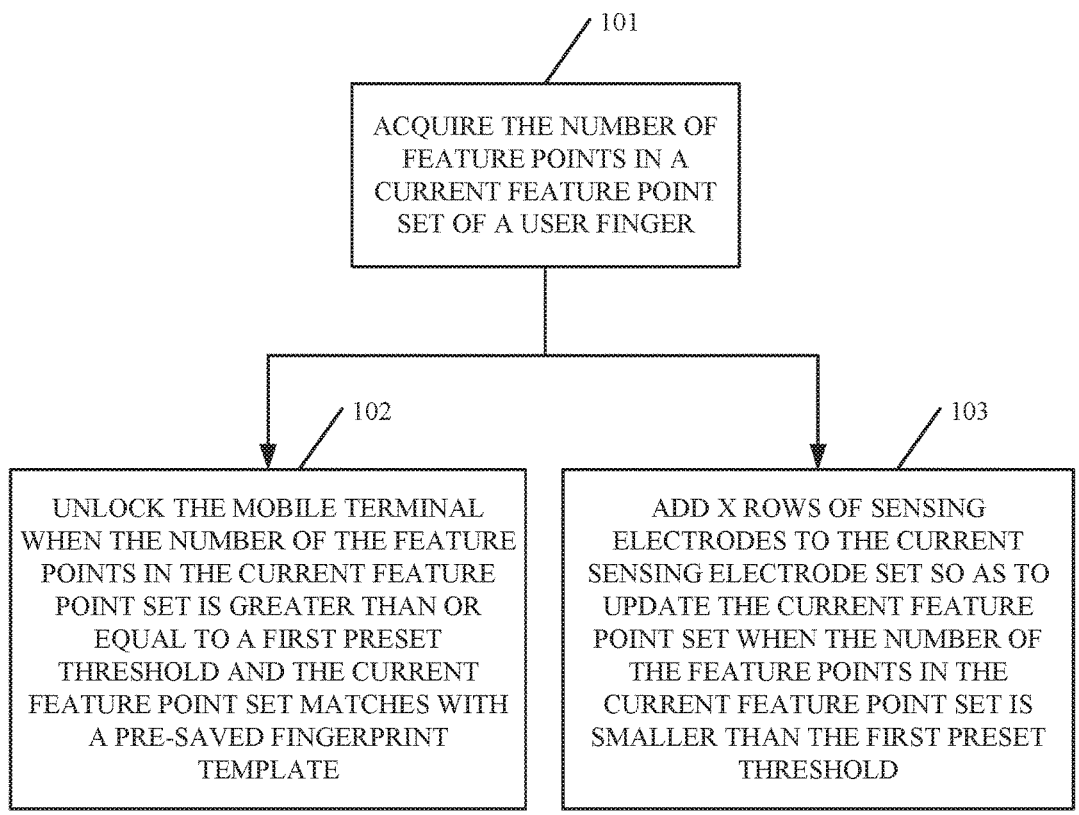
FIG. 1 is a flowchart of a method for controlling unlocking in accordance with an implementation of the present disclosure.

FIG. 1 is a method for controlling unlocking in accordance with an implementation of the present disclosure. As illustrated by FIG. 1, the method for controlling unlocking may begin at block 101.

At block 101, a mobile terminal acquires the number of feature points in a current feature point set of a user finger. The current feature point set is formed by the mobile terminal scanning the user finger according to a current sensing electrode set. The current sensing electrode set includes sensing electrodes in rows from the $([M/2]-k11)^{th}$ to $([M/2]+k12)^{th}$ row in a sensing electrode array of M rows and N columns. The sensing electrode array is arranged in a fingerprint identification sensor of the mobile terminal, and M, N, k11, and k12 are positive integers.

When the mobile terminal is in a screen-off status or a screen-on and screen-locking status, [M/2] is a numerical value integrated from M/2, [M/2] is greater than k11, and [M/2]−k12 is smaller than M. The integral function [x] (x is a real number) is used to acquire a maximum integer not greater than x, and the integral function is widely used in computer technology.

The sensing electrodes in the current sensing electrode set are in an intermediate region of the sensing electrode array of the fingerprint identification sensor. Generally, a distinguishing degree of scanning the user finger by the sensing electrodes in the intermediate region is higher than that of scanning the user finger by sensing electrodes in an edge region of the sensing electrode array. Therefore, the sensing electrodes in the current sensing electrode set are herein defined in the rows from the $([M/2]-k11)^{th}$ to $([M/2]+k12)^{th}$ row in the sensing electrode array of the fingerprint identification sensor, which is beneficial for meeting distinguishing requirements of the mobile terminal on fingerprint unlocking.

For example, when the mobile terminal detects a touch operation of the user finger on the fingerprint identification sensor of the mobile terminal which may be, for example, press or double-click or other touch operations that are not uniquely limited in the implementation of the disclosure, the mobile terminal wakes up the fingerprint identification sensor and scans the user finger through the current sensing electrode set to acquire fingerprint data, generates a fingerprint image according to the fingerprint data, and extracts feature points according to the fingerprint image to form the current feature point set of the user finger.

As the fingerprint of the user finger includes rugged finger valleys and finger peaks, the mobile terminal can calculate specific distribution, of the finger valleys and the finger peaks based on capacitance values formed between the finger valleys and the sensing electrodes (such as capacitive sensors) and capacitance values formed between the finger peaks and the sensing electrodes (such as capacitive sensors).

A working principle is as follows: each sensing electrode of the fingerprint identification sensor is pre-charged to a reference voltage. When the finger contacts with the sensing electrode, as the peak is convex and the valley is concave, a distance between the finger peak and a plane of the sensing electrode is different from that between the finger valley and the plane of the sensing electrode. According to a relationship between capacitance values and distances, different capacitance values may be formed at the positions of the finger peaks and the finger valleys, and then a discharge current is used to discharge. Because the capacitance values corresponding to the finger peaks and the finger valleys are different, the corresponding discharge speeds are also different. The finger peak is close to the sensing electrode, the capacitance is high, and the discharge speed is slower. The finger valley is far from the sensing electrode, the capacitance is low, and the discharge speed is faster. According to different discharge speeds, the positions of the finger peaks and the finger valleys can be determined, so that fingerprint image data corresponding to the user finger is generated.

At block 102, when the mobile terminal detects that the number of the feature points in the current feature point set is greater than or equal to a first preset threshold, the mobile terminal is unlocked when the current feature point set matches with the pre-saved fingerprint template.

Generally, when fingerprint unlocking is performed on the mobile terminal, and a fingerprint image which generally includes at least twenty feature points is generated according to the fingerprint data collected by the fingerprint identification sensor, when the twenty feature points are successfully matched by the mobile terminal, the user identity may be determined to perform the unlocking operation. That is to say, when the mobile terminal acquires twenty feature points, the user identity can be identified, and the basic safety requirements of fingerprint unlocking can be achieved. Therefore, the first preset threshold mentioned above may be any numerical value greater than or equal to twenty and smaller than the quantity of the fingerprint feature points in a pre-saved fingerprint template, such as twenty-one, twenty-two, twenty-three, or the like.

For example, an implementation manner for matching the current feature point set with the pre-saved fingerprint template is as follows.

The mobile terminal calculates a matching degree between each feature point in the current feature point set and the pre-saved fingerprint template, and when the number of the feature points in the current feature point set with a matching degree greater than a preset matching degree is greater than a second preset threshold, the mobile terminal determines that the current feature point set matches with the pre-saved fingerprint template.

An implementation manner for unlocking the mobile terminal is as follows: loading a system application desktop of the mobile terminal; or loading an application interface of an application interrupted in the previous screen-off operation of the mobile terminal; or loading an application interface of a preset application associated with the fingerprint data.

It can be seen that in the method for controlling unlocking of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent.

In at least one alternative implementation, the method may further include a process at block 103. At block 103, when the mobile terminal detects that the number of the feature points in the current feature point set is smaller than the first preset threshold, X rows of sensing electrodes are added to the current sensing electrode set so as to update the current feature point set. The X rows include X1 rows preceding and adjacent to the $([M/2]-k11)^{th}$ row and X2 rows next to and adjacent to the $([M/2]+k12)^{th}$ row, X1, X2 and X are positive integers, and X1+X2=X.

For example, an implementation manner for the mobile terminal to add X rows of sensing electrodes to the current sensing electrode set so as to update the current feature point set is as follows.

The mobile terminal adds the X rows of sensing electrodes to the current sensing electrode set so as to update the current sensing electrode set, and scans and processes the user finger so as to update the current feature point set according to the updated current sensing electrode set.

An implementation manner for the mobile terminal to scan the user finger so as to update the current feature point set according to the updated current sensing electrode is as follows.

The mobile terminal scans the user finger according to the sensing electrodes in the updated current sensing electrode set so as to acquire the fingerprint data, generates the fingerprint image according to the fingerprint data, and extracts feature points of the fingerprint image, and updates the current feature point set by using the feature points extracted.

An implementation manner for the mobile terminal to scan the user finger according to the sensing electrode in the updated current sensing electrode set so as to acquire the fingerprint data is as follows.

The mobile terminal acquires n2 underlying data values through n2 normal sensing electrodes in the current sensing electrode set updated, the current sensing electrode set includes n1 abnormal sensing electrodes and the n2 normal sensing electrodes, and n1 and n2 are positive integers, and the mobile terminal determines n1 reference underlying data values corresponding to the n1 abnormal sensing electrodes according to the n2 underlying data values collected by the n2 normal sensing electrodes, and the fingerprint data is formed by the n1 reference underlying data values and the n2 underlying data values.

Further, an implementation manner for the mobile terminal to determine the n1 reference underlying data values corresponding to the n1 abnormal sensing electrodes according to the n2 underlying data values collected by the n2 normal sensing electrodes is as follows.

The mobile terminal calculates an average value of the n2 underlying data values, and determines each of the n1 reference underlying data values corresponding to the n1 abnormal sensing electrodes to be the average value.

It is thus clear that the abnormal underlying data values collected by the abnormal sensing electrodes can be modified by the mobile terminal, which is beneficial for improving the accuracy of the fingerprint data, and thus improving the unlocking security.

Further, another implementation manner for the mobile terminal to determine the n1 reference underlying data values corresponding to the n1 abnormal sensing electrodes according to the n2 underlying data values collected by the n2 normal sensing electrodes is as follows.

The mobile terminal acquires a coordinate value of each abnormal sensing electrode of the n1 abnormal sensing electrodes, and performs mean processing on each abnormal sensing electrode according to the coordinate value of each abnormal sensing electrode and the n2 underlying data values, so as to acquire the n1 reference underlying data values corresponding to the n1 abnormal sensing electrodes.

The mean processing includes the follows. x sensing electrodes of the n2 normal sensing electrodes are determined, and a distance between each of the x sensing electrodes and the coordinate value of each of the abnormal sensing electrodes subjected to the current mean processing is smaller than a preset distance. The average value of x underlying data values corresponding to the x sensing electrodes is calculated, and the average value is determined to be the reference underlying data value of each abnormal sensing electrode subjected to the current mean processing, and x is a positive integer.

It is thus clear that the abnormal underlying data values collected by the abnormal sensing electrodes can be modified by the mobile terminal, which is beneficial for improving the accuracy of the fingerprint data, and thus improving the unlocking security.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the implementation of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the time of matching the feature points is further shortened as well by using fewer feature points of the user finger, which is beneficial for enhancing the fingerprint unlocking speed of the mobile terminal, and improving user experience.

Figure 2:
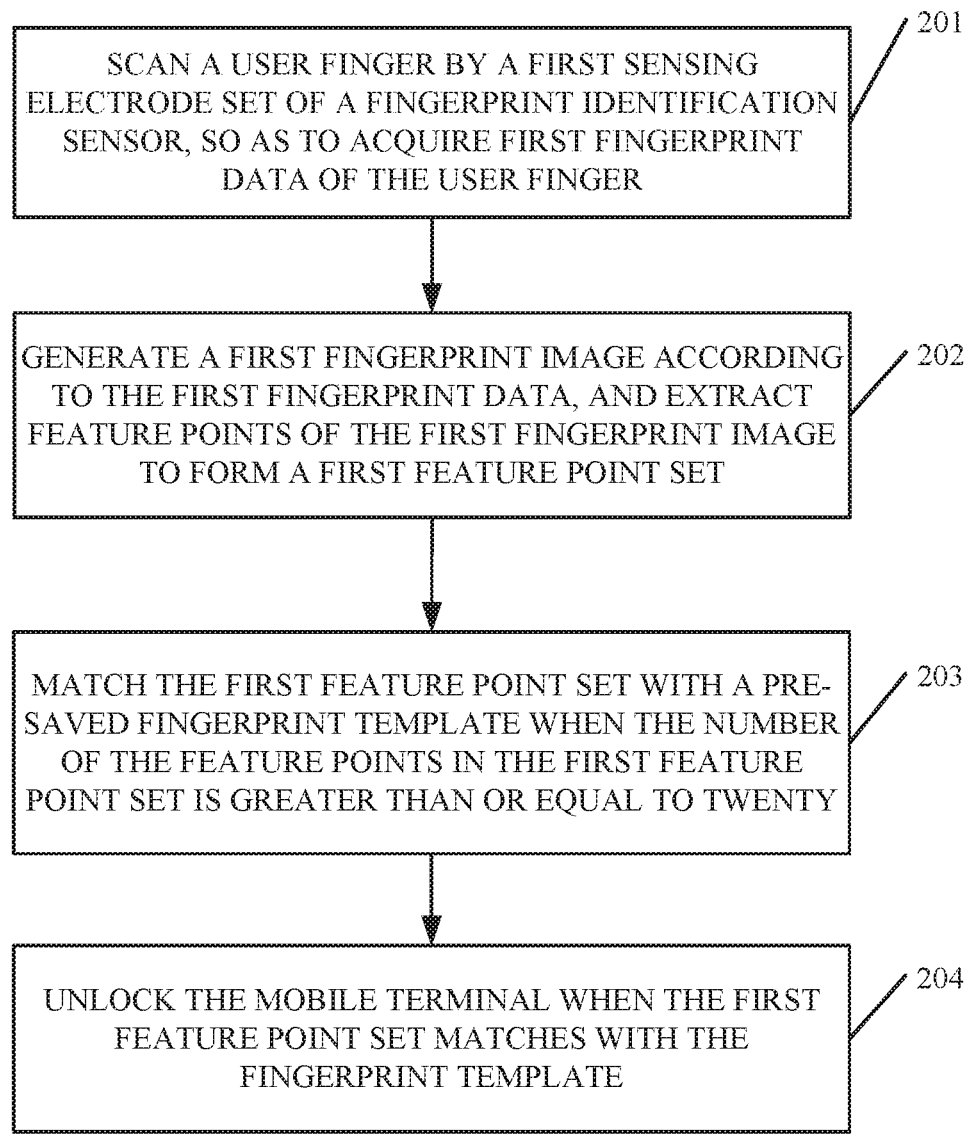
FIG. 2 is a flowchart of another method for controlling unlocking in accordance with an implementation of the present disclosure.

Consistent with the implementation as illustrated by FIG. 1, FIG. 2 is a flowchart of another method for controlling unlocking provided by an implementation of the present disclosure. As illustrated in the FIG. 2, the method for controlling unlocking may begin at block 201.

At block 201, when a mobile terminal detects a touch operation on a fingerprint identification sensor of the mobile terminal, a user finger is scanned by a first sensing electrode set of the fingerprint identification sensor, so as to acquire first fingerprint data of the user finger. The fingerprint identification sensor includes a sensing electrode array of 192 rows and 56 columns, and the first sensing electrode set includes sensing electrodes from the $91^{st}$ row to the $101^{st}$ row of the sensing electrode array.

At block 202, the mobile terminal generates a first fingerprint image according to the first fingerprint data, and extracts feature points of the first fingerprint image to form a first feature point set.

At block 203, when the number of the feature points in the first feature point set is greater than or equal to 20, the mobile terminal matches the first feature point set with a pre-saved fingerprint template.

At block 204, when the first feature point set matches with the fingerprint template, the mobile terminal is unlocked.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the implementation of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the time of matching the feature points is further shortened as well by using fewer feature points of the user finger, which is beneficial for enhancing the fingerprint unlocking speed of the mobile terminal, and improving user experience.

Figure 3:
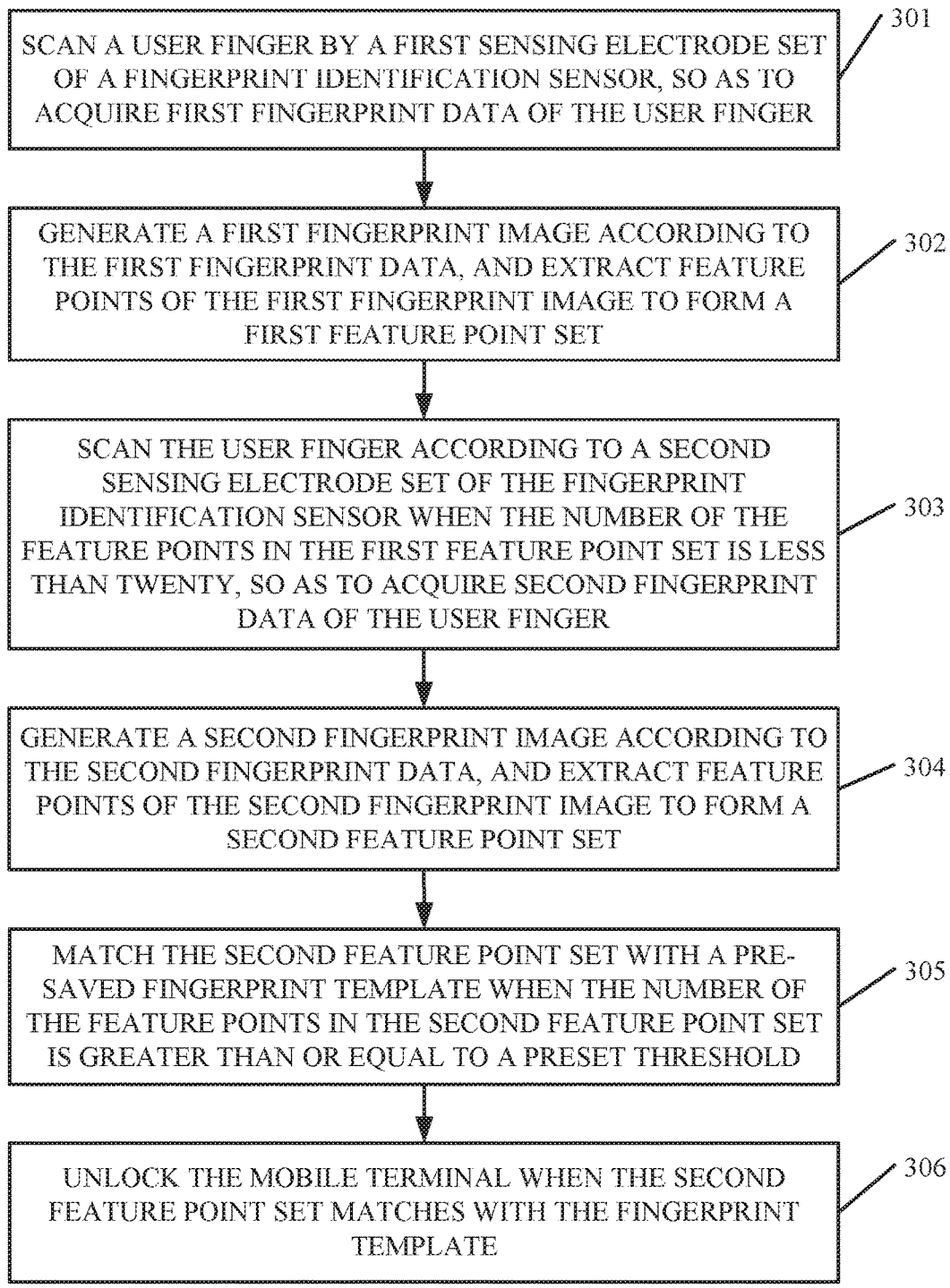
FIG. 3 is a flowchart of another method for controlling unlocking in accordance with an implementation of the present disclosure.

Consistent with the implementations as illustrated by FIG. 1 and FIG. 2, FIG. 3 is a flowchart of another method for controlling unlocking provided by an implementation of the present disclosure. As illustrated in FIG. 3, the method for controlling unlocking may begin at block 301.

At block 301, when a mobile terminal detects a touch operation on a fingerprint identification sensor of the mobile terminal, a user finger is scanned by a first sensing electrode set of the fingerprint identification sensor, so as to acquire first fingerprint data of the user finger. The fingerprint identification sensor includes a sensing electrode array of 192 rows and 56 columns, and the first sensing electrode set includes sensing electrodes from the $91^{st}$ row to the $101^{st}$ row of the sensing electrode array.

At block 302, the mobile terminal generates a first fingerprint image according to the first fingerprint data, and extracts feature points of the first fingerprint image to form a first feature point set.

At block 303, when the number of the feature points in the first feature point set is less than twenty, the mobile terminal scans the user finger according to a second sensing electrode set of the fingerprint identification sensor, so as to acquire second fingerprint data of the user finger. The second sensing electrode set includes the sensing electrodes from the $187^{th}$ row to the $106^{th}$ row of the sensing electrode array.

At block 304, the mobile terminal generates a second fingerprint image according to the second fingerprint data, and extracts feature points of the second fingerprint image to form a second feature point set.

At block 305, when the number of the feature points in the second feature point set is greater than or equal to the preset threshold, the mobile terminal matches the second feature point set with a pre-saved fingerprint template.

At block 306, when the second feature point set matches with the fingerprint template, the mobile terminal is unlocked.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the implementation of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the matching time of the feature points is further shortened as well by using fewer feature points of the user finger, which is beneficial for enhancing the fingerprint unlocking speed of the mobile terminal, and improving user experience.

Figure 4:
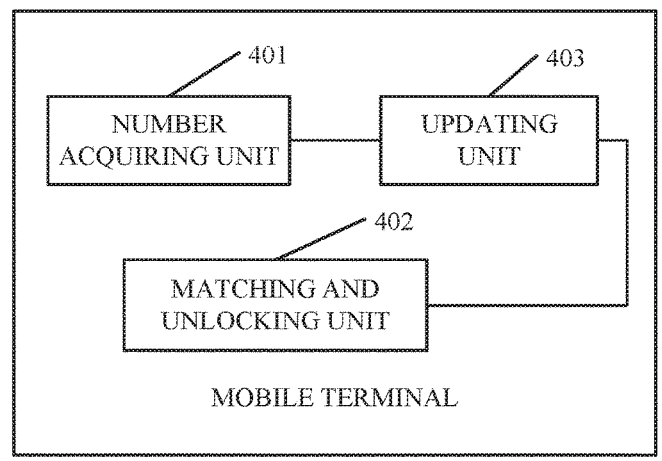
FIG. 4 is a unit constitution block diagram of a mobile terminal in accordance with an implementation of the present disclosure.

The following is a device implementation of the present disclosure. The device implementation of the present disclosure is used to execute the method realized by the method implementation of the present disclosure. As illustrated by FIG. 4, a mobile terminal can include a number acquiring unit 401 and a matching and unlocking unit 402.

The number acquiring unit 401 is configured to acquire the number of feature points in a current feature point set of a user finger. The current feature point set is formed by a mobile terminal scanning the user finger according to a current sensing electrode set. The current sensing electrode set includes sensing electrodes in rows from the $([M/2]-k11)^{th}$ to $([M/2]+k12)^{th}$ row in a sensing electrode array of M rows and N columns. The sensing electrode array is arranged in the fingerprint identification sensor of the mobile terminal, and M, N, k11, and k12 are positive integers.

The matching and unlocking unit 402 is configured to unlock the mobile terminal when the number of the feature points in the current feature point set is greater than or equal to the first preset threshold and the current feature point set matches with a pre-saved fingerprint template.

In at least one alternative implementation, the matching and unlocking unit 402 being configured to match the current feature point set with the pre-saved fingerprint template includes that the matching and unlocking unit 402 is configured to calculate a matching degree between each feature point in the current feature point set and the pre-saved fingerprint template, and determine that the current feature point set matches with the pre-saved fingerprint template when the number of the feature points in the current feature point set with a matching degree greater than a preset matching degree is greater than a second preset threshold.

In at least one alternative implementation, the mobile terminal may further include an updating unit 403 configured to add X rows of sensing electrodes to the current sensing electrode set so as to update the current feature point set when the number of the feature points in the current feature point set is smaller than a first preset threshold. The X rows include X1 rows preceding and adjacent to the $([M/2]-k11)^{th}$ row and X2 rows next to and adjacent to the $([M/2]+k12)^{th}$ row, X1, X2 and X are positive integers, and X=X1+X2.

In at least one alternative implementation, the updating unit 403 configured to add the X rows of sensing electrodes to the current sensing electrode set so as to update the current feature point set is further configured to add the X rows of sensing electrodes to the current sensing electrode set so as to update the current sensing electrode set, and scan the user finger so as to update the current feature point set according to the updated current sensing electrode set.

In at least one alternative implementation, the updating unit 403 configured to scan the user finger so as to update the current feature point set according to the current sensing electrode set updated is further configured to scan the user finger according to the sensing electrodes in the updated current sensing electrode set so as to acquire the fingerprint data, generate a fingerprint image according to the fingerprint data, extract feature points of the fingerprint image, and update the current feature point set by using the feature points extracted.

In at least one alternative implementation, the updating unit 403 configured to scan the user finger according to the sensing electrode in the updated current sensing electrode set so as to acquire the fingerprint data includes that the updating unit 403 is further configured to acquire n2 underlying data values through n2 normal sensing electrodes in the updated current sensing electrode set. The current sensing electrode set includes n1 abnormal sensing electrodes and the n2 normal sensing electrodes, and n1 and n2 are positive integers. The updating unit 403 configured to scan the user finger according to the sensing electrode in the updated current sensing electrode set so as to acquire the fingerprint data is further configured to determine n1 reference underlying data values corresponding to the n1 abnormal sensing electrodes according to the n2 underlying data values collected by the n2 normal sensing electrodes. The fingerprint data is formed by the n1 reference underlying data values and the n2 underlying data values.

In at least one alternative implementation, the updating unit 403 configured to determine the n1 reference underlying data values corresponding to the n1 abnormal sensing electrodes according to the n2 underlying data values collected by the n2 normal sensing electrodes is further configured to calculate an average value of the n2 underlying data value, and determine each of the n1 reference underlying data values corresponding to the n1 abnormal sensing electrodes to be the average value.

The updating unit 403 configured to determine the n1 reference underlying data values corresponding to the n1 abnormal sensing electrodes according to the n2 underlying data values collected by the n2 normal sensing electrodes is further configured to acquire a coordinate value of each abnormal sensing electrode of the n1 abnormal sensing electrodes, and perform mean processing on each abnormal sensing electrode according to the coordinate value of each abnormal sensing electrode and the n2 underlying data values, so as to acquire the n1 reference underlying data values corresponding to the n1 abnormal sensing electrodes.

The mean processing includes the follows. x sensing electrodes of the n2 normal sensing electrodes are determined, where a distance between each of the x sensing electrodes and the coordinate value of each of the abnormal sensing electrodes subjected to the current mean processing is smaller than a preset distance. An average value of x underlying data values corresponding to the x sensing electrodes is determined, and the average value is determined to be the reference underlying data value of each of the abnormal sensing electrodes subjected to the current mean processing, and x is a positive integer.

It shall be noted that the mobile terminal described in the device implementation of the present disclosure is illustrated in the form of functional units. The term "unit" used herein shall be taken in the broadest possible sense. Objects for realizing the function of each unit can be an application specific integrated circuit (ASIC), a single circuit, a processor (shared, specific, or chipset) for executing one or more software or hardware procedures, a memory, a combined logic circuit, and/or other appropriate assembly for realizing the above function.

Figure 5:
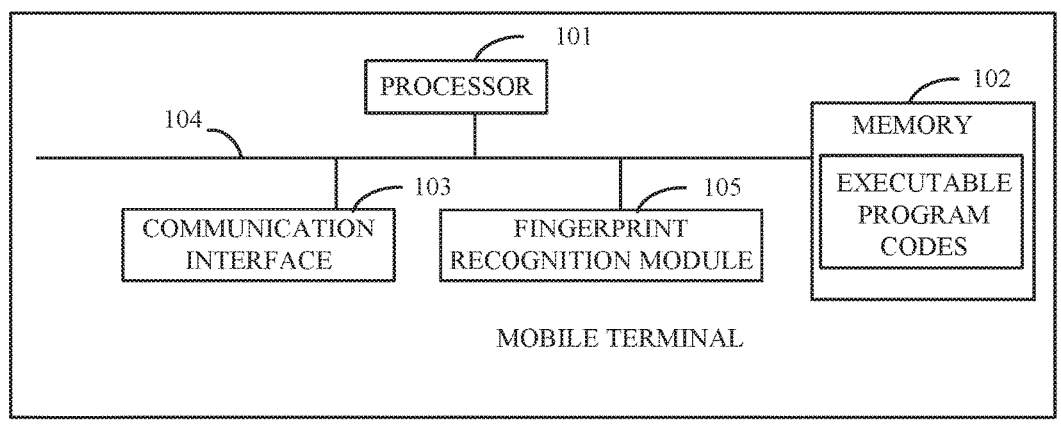
FIG. 5 is a structure diagram of a mobile terminal in accordance with an implementation of the present disclosure.

For example, the function that the updating unit 403 updates the current feature point set can be realized by the mobile terminal of FIG. 5. The manner is that a processor 101 invokes executable program codes of a memory 102 to add X rows of sensing electrodes to the current sensing electrode set so as to update the current feature point set.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the implementation of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the time of matching the feature points is further shortened as well by using fewer feature points of the user finger, which is beneficial for enhancing the fingerprint unlocking speed of the mobile terminal, and improving user experience.

An implementation of the present disclosure further provides another mobile terminal. As illustrated by FIG. 5, the mobile terminal includes the processor 101, the memory 102, a communication interface 103, a communication bus 104, and a fingerprint recognition module 105. The processor 101, the memory 102, the fingerprint recognition module 105, and the communication interface 103 are coupled and communicate with each other via the communication bus 104. The processor 101 controls wireless communication with an external cellular network. The communication interface 103 includes but not limited to an antenna, an amplifier, a transceiver, a coupler, a low noise amplifier (LNA), a duplexer, and so on. The fingerprint recognition module 105 is configured to acquire fingerprint data of a user finger. The memory 102 includes at least one of the following: a random access memory, a non-volatile memory, and an external memory. The memory 102 stores executable program codes. The executable program codes can guide the processor 101 to execute the method for controlling unlocking specifically illustrated in the method implementation of the present disclosure.

The processor 101 acquires the number of feature points in a current feature point set of a user finger. The current feature point set is formed by the mobile terminal scanning the user finger according to a current sensing electrode set. The current sensing electrode set includes sensing electrodes in rows from the $([M/2]-k11)^{th}$ to $([M/2]+k12)^{th}$ row in a sensing electrode array of M rows and N columns. The sensing electrode array is arranged in the fingerprint recognition module 105 of the mobile terminal, and M, N, k11, and k12 are positive integers.

When the number of the feature points in the current feature point set is greater than or equal to a first preset threshold and the current feature point set matches with a pre-saved fingerprint template, the processor 101 unlocks the mobile terminal.

The processor 101 adds X rows of sensing electrodes to the current sensing electrode set so as to update the current feature point set when the number of the feature points in the current feature point set is less than the first preset value. The X rows include X1 rows preceding and adjacent to the $([M/2]-k11)^{th}$ row and X2 rows next to and adjacent to the $([M/2]+k12)^{th}$ row, X1, X2 and X are positive integers, and X=X1+X2.

For the existing fingerprint unlocking solution, all feature points in a fingerprint template feature point set are matched with a reference feature point set of a user finger, and the fingerprint template feature point set of the mobile terminal stores the feature points of the fingerprints of the user finger as comprehensive as possible. Therefore, the number of the feature points in the originally stored fingerprint template feature point set is relatively large, such as 200, 210, or even above 300. While during actual fingerprint unlocking, only 20 effective feature points of the fingerprints of the user finger are generally needed to identify the user identity and perform the unlocking operation. Therefore, in the implementation of the present disclosure, by gradually enlarging the region of the sensing electrodes for scanning the user finger, the sensing electrode region as small as possible that meets the identification requirements and safety requirements on fingerprint unlocking can be quickly touched, so as to reduce the time that the mobile terminal scans the user finger to the greatest extent. Meanwhile, the time of matching the feature points is further shortened as well by using fewer feature points of the user finger, which is beneficial for enhancing the fingerprint unlocking speed of the mobile terminal, and improving user experience.

Additionally, the executable program codes stored in the memory 102 is further configured to execute related steps of the methods for controlling unlocking illustrated by FIG. 1, FIG. 2, and FIG. 3, for example, execute the step of adding X rows of sensing electrodes to the current sensing electrode set so as to update the current feature point set, and so on.

Figure 6:
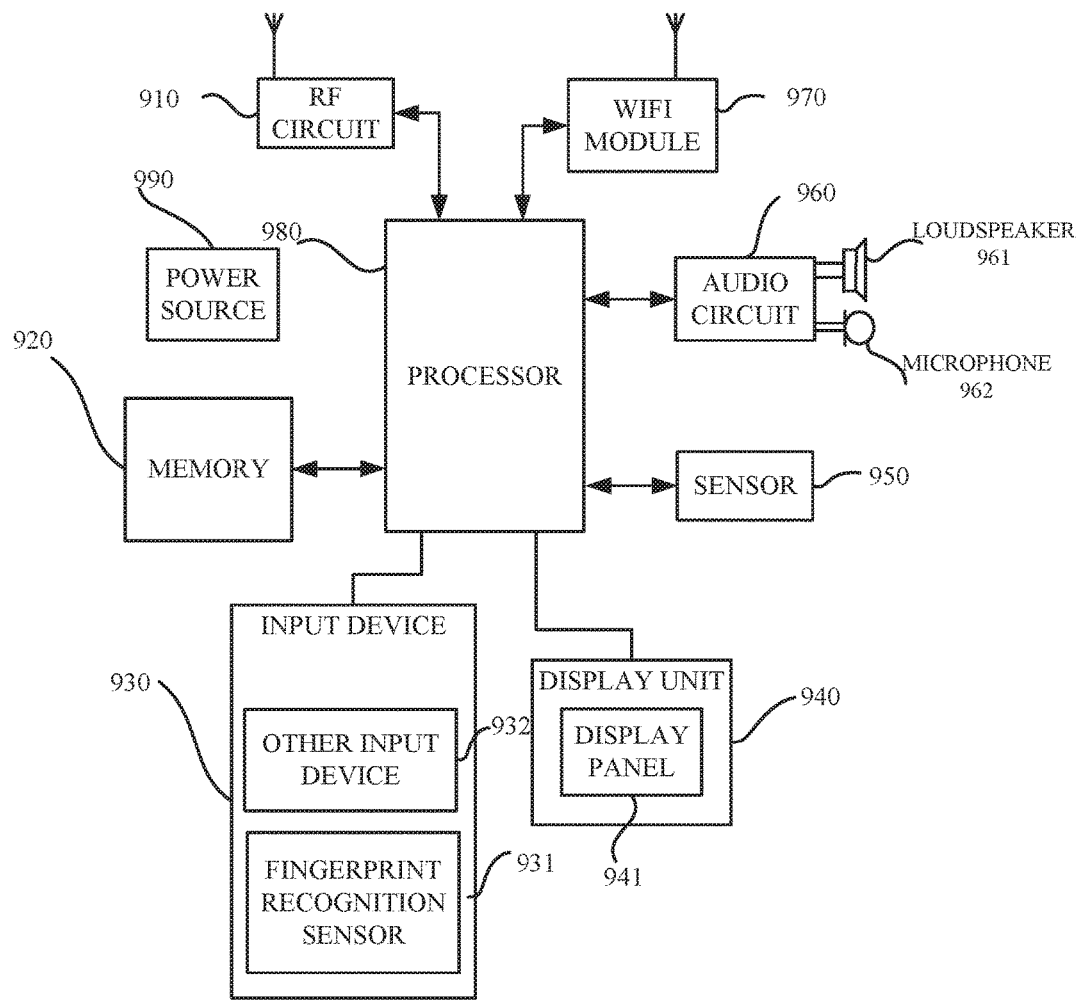
FIG. 6 is a structure diagram of another mobile terminal in accordance with an implementation of the present disclosure.

An implementation of the present disclosure further provides another mobile terminal. As illustrated in FIG. 6, for the sake of convenient illustration, only parts related to the implementation of the present disclosure are illustrated, and the method implementations of the present disclosure are referred to know technical details. The mobile terminal can be a mobile phone, a tablet computer, a personal digital assistant (PDA), a point of sales (POS), an on-board computer, or other. A mobile phone is taken as an example to illustrate the mobile phone.

FIG. 6 is a structure diagram of a mobile phone in accordance with an implementation of the present disclosure. The mobile phone may include an RF circuit 910, a memory 920, an input unit 930, a display unit 940, at least one sensor 950, an audio circuit 960, a wireless fidelity (WiFi) module 970, a processor 980, a power source 990, and the like.

The RF circuit 910 may be configured to receive and transmit signals in an information receiving and transmitting or communication process, and transmit received downlink information of a base station to the processor 980 for processing. In addition, uplink data is transmitted to the base station. Generally, the RF circuit 910 includes, but is not limited to, an antenna, at least one amplifier, a transceiver, a coupler, a low noise amplifier (LNA), a duplexer, etc. In addition, the RF circuit 910 may further communicate with other devices via wireless communication and a network. The wireless communication may use any one communication standard or protocol, including, but not limited to, a global system of mobile communication (GSM), general packet radio service (GPRS), code division multiple access (CDMA), wideband code division multiple access (WCDMA), long term evolution (LTE), an E-mail, short messaging service (SMS), etc.

The memory 920 may be configured to store software programs and modules, and the processor 980 executes various function applications and data processing of the mobile phone by running the software programs and the modules stored in the memory 920. The memory 920 may mainly include a storage program region and a storage data region. The storage program region may store an operating system, and an application program needed for at least one function (such as a function of obtaining a fingerprint image that succeeds in fingerprint matching, a function of assessing fingerprint image, a function of updating a fingerprint template, and the like). The storage data region may store data (such as history fingerprint image data that succeeds in fingerprint matching, the number of times that all fingerprint templates are successfully matched in a second time period) created according to use of the mobile phone. In addition, the memory 920 may include a high-speed RAM, and may further include a non-volatile memory such as a disk storage device, a flash device, or other non-volatile solid storage devices.

The input unit 930 may be configured to receive input digital or character information and generate key signal input associated with user setting and functional control of the mobile phone. Specifically, the input unit 930 may include a fingerprint recognition sensor 931 and other input devices 932. The fingerprint recognition sensor 931 can collect fingerprint data. In at least one alternative implementation, the fingerprint recognition sensor 931 may include an optical fingerprint sensor, a capacitive fingerprint sensor, and a radio fingerprint sensor. The capacitive fingerprint sensor is taken as an example to illustrate the fingerprint recognition sensor. The capacitive fingerprint sensor includes sensing electrodes (abnormal sensing electrodes and normal sensing electrodes), and a signal processing circuit (for example, an amplifying circuit, a noise reduction circuit, an analog-digital circuit, and so on). Besides the fingerprint recognition sensor, the input unit 930 may further include the other input devices 932. The other input devices 932 may include, but are not limited to, one or more of a physical keyboard, a functional key (such as a volume control key and a switch key), a trackball, a mouse, and an operating rod.

The display unit 940 may be configured to display information input by the user or information provided for the user or various menus of the mobile phone. The display unit 940 may include a display panel 941, and alternatively, the display panel 941 may be configured in a form of a Liquid Crystal Display (LCD), an Organic Light-Emitting Diode (OLED), etc. Furthermore, the touch panel 931 may cover the display panel 941. When the touch panel 931 detects the touch operation thereon or nearby, the touch operation is transmitted to the processor 980 to determine the type of a touch event, and then the processor 980 provides corresponding visual output on the display panel 941. Although, the touch panel 931 and the display panel 941 implement input of the mobile phone and input functions by serving as two independent parts in FIG. 6, the touch panel 931 and the display panel 941 may be integrated to implement the input of the mobile phone and the input functions in some implementations.

The at least one sensor 950 may include a light sensor, a motion sensor, and other sensors. Specifically, the light sensor may include an ambient light sensor and a proximity sensor, the ambient light sensor may adjust the luminance of a display panel 941 according to the brightness of ambient light, and the proximity sensor may close the display panel 941 and/or backlight when the mobile phone reaches nearby the ear. As one of the motion sensors, an accelerometer sensor may detect the magnitude of an accelerated speed in each direction (generally, three-axis), the size and direction of a gravity may be detected while resting, and the accelerometer sensor may be configured to identify an application of a mobile phone gesture (e.g., horizontal and vertical screen switching, relevant games, and magnetometer gesture calibration), and vibration identification relevant functions (e.g., pedometer and knocking), etc. Other sensors such as a gyroscope sensor, a barometer sensor, a hygrometer sensor, a thermometer sensor, and an infrared sensor configurable for the mobile phone will not be elaborated herein.

The audio circuit 960, a loudspeaker 961, and a microphone 962 may provide an audio interface between the user and the mobile phone. The audio circuit 960 may transmit an electric signal converted from the received audio data to the loudspeaker 961, and the loudspeaker 961 converts the electric signal into a sound signal for output. Besides, the microphone 962 converts a collected sound signal into an electric signal, the audio circuit 960 converts the received electric signal into audio data and then outputs the audio data to the processor 980 for processing, the audio data is transmitted to another mobile phone via the RF circuit 910, or the audio data is output to the memory 920 for further processing.

WiFi belongs to a short-range wireless transmission technology, the mobile phone may assist the user in E-mail receiving and sending, webpage browsing, access to streaming media and the like by means of the WiFi module 970, and it provides a wireless wideband internet access for the user. Although FIG. 6 shows the WiFi module 970, it may be understood that the WiFi module 970 does not belong to necessary components of the mobile phone and can totally be omitted without changing the essence of the present disclosure as required.

The processor 980 is a control center of the mobile phone, and is configured to connect all parts of the whole mobile phone by utilizing various interfaces and lines, to run or execute the software program and/or the module stored in the memory 920, and to call data stored in the memory 920 to execute various functions and processing data of the mobile phone, so as to wholly monitor the mobile phone. Alternatively, the processor 980 may include one or more processing units. Preferably, the processor 980 may be integrated with an application processor and a modulation-demodulation processor, the application processor mainly processes an operation system, a user interface, an application program and the like, and the modulation-demodulation processor mainly processes wireless communication. It may be understood that the modulation-demodulation processor may not be integrated into the processor 980.

The power source 990 (such as a battery) supplies power to each component. Preferably, the power supply may be connected with the processor 980 logically via a power supply management system, so as to implement functions of charging, discharging and power consumption management and the like by means of the power supply management system.

The mobile phone may further include a camera, a Bluetooth module and the like, which are not shown, though, will not be elaborated herein.

In the foregoing implementations illustrated by FIG. 1, FIG. 2, and FIG. 3, each process may be implemented on the basis of the structure of the mobile phone.

In the foregoing implementation illustrated by FIG. 4, the function of each unit may be implemented on the basis of the structure of the terminal phone.

The implementations of the present disclosure also provide a computer storage medium. The computer storage medium may store a program, and the program executes some or all of the processes of any method for controlling unlocking in the method implementations.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the implementations described in the specification are exemplary implementations and the actions and modules involved are not necessarily necessary for the present disclosure.

In the foregoing implementations, descriptions of each implementation are emphasized respectively, and parts which are not elaborated in a certain implementation may subject to relevant descriptions of other implementations.

The apparatus disclosed in implementations provided herein may be implemented in other ways. For example, the device/apparatus implementations described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely, they may be in the same place or may be distributed to multiple network elements. Part or all of the units may be selected per actual needs to achieve the purpose of the technical solutions of the implementations.

In addition, the functional units in various implementations of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory described above includes a variety of media that can store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or CD, and so on.

The foregoing specifically illustrates the implementation of the present disclosure. The principles and implementations of the present disclosure are illustrated by means of examples. The above implementation illustrations are just used to help to understand the method and core concepts of the present disclosure. For a person skilled in the art, according to the idea of the present disclosure, changes may be made based on the implementations and application ranges. In conclusion, the present disclosure shall not be limited by the specification.

What is claimed is:

1. A method for controlling unlocking, comprising:

acquiring a number of feature points in a current feature point set of a finger of a user, the current feature point set being formed by scanning the finger by a mobile terminal according to a current sensing electrode set, the current sensing electrode set comprising sensing electrodes from the $([M/2]-k11)^{th}$ row to the $([M/2]+k12)^{th}$ row in a sensing electrode array with M rows and N columns, the sensing electrode array being arranged in a fingerprint identification module of the mobile terminal, and M, N, k11, and k12 being positive integers;

adding X rows of sensing electrodes to the current sensing electrode set to update the current sensing electrode set, when the number of the feature points in the current feature point set is smaller than a first preset threshold;

scanning the finger according to sensing electrodes in the current sensing electrode set updated to obtain fingerprint data;

generating a fingerprint image based on the fingerprint data;

extracting feature points from the fingerprint image and updating the current feature point set based on the feature points extracted, the X rows comprising X1 rows preceding and adjacent to the $([M/2]-k11)^{th}$ row and X2 rows next to and adjacent to the $([M/2]+k12)^{th}$ row, with X1, X2, and X being positive integers; and unlocking the mobile terminal when the number of the feature points in the current feature point set is greater than or equal to the first preset threshold and the current feature point set is matched with a pre-saved fingerprint template.

2. The method of claim 1, wherein scanning the finger according to the sensing electrodes in the current sensing electrode set updated to obtain the fingerprint data comprises:

acquiring n2 underlying data values through n2 normal sensing electrodes in the current sensing electrode set updated, the current sensing electrode set comprising n1 abnormal sensing electrodes and the n2 normal sensing electrodes, and n1 and n2 being positive integers; and determining n1 reference underlying data values corresponding to the n1 abnormal sensing electrodes according to the n2 underlying data values acquired through the n2 normal sensing electrodes, the fingerprint data being formed by the n1 reference underlying data values and the n2 underlying data values.

3. The method of claim 2, wherein determining the n1 reference underlying data values corresponding to the n1 abnormal sensing electrodes according to the n2 underlying data values acquired through the n2 normal sensing electrodes comprises:

calculating an average value of the n2 underlying data values; and determining each of the n1 reference underlying data values corresponding to the n1 abnormal sensing electrodes to be the average value.

4. The method of claim 2, wherein determining the n1 reference underlying data values corresponding to the n1 abnormal sensing electrodes according to the n2 underlying data values acquired through the n2 normal sensing electrodes comprises:

acquiring a coordinate value of each of the n1 abnormal sensing electrodes; and performing a mean processing on each abnormal sensing electrode according to the coordinate value of each abnormal sensing electrode and the n2 underlying data values, to acquire the n1 reference underlying data values corresponding to the n1 abnormal sensing electrodes;

wherein the mean processing comprises:

determining, from among the n2 normal sensing electrodes, x sensing electrodes whose distance to a coordinate value of an abnormal sensing electrode currently subjected to the mean processing is smaller than a preset distance;

calculating an average value of x underlying data values corresponding to the x sensing electrodes; and determining the average value to be a reference underlying data value of the abnormal sensing electrode currently subjected to the mean processing, with x being a positive integer.

5. The method of claim 1, wherein the current feature point set matching with the pre-saved fingerprint template comprises:

calculating a matching degree between each feature point in the current feature point set and the pre-saved fingerprint template; and determining that the current feature point set is matched with the pre-saved fingerprint template when the number of feature points in the current feature point set whose matching degree is greater than a preset matching degree is greater than a second preset threshold.

6. The method of claim 2, wherein the current feature point set matching with the pre-saved fingerprint template comprises:
calculating a matching degree between each feature point in the current feature point set and the pre-saved fingerprint template; and
determining that the current feature point set is matched with the pre-saved fingerprint template when the number of feature points in the current feature point set whose matching degree is greater than a preset matching degree is greater than a second preset threshold.

7. The method of claim 3, wherein the current feature point set matching with the pre-saved fingerprint template comprises:
calculating a matching degree between each feature point in the current feature point set and the pre-saved fingerprint template; and
determining that the current feature point set is matched with the pre-saved fingerprint template when the number of feature points in the current feature point set whose matching degree is greater than a preset matching degree is greater than a second preset threshold.

8. The method of claim 4, wherein the current feature point set matching with the pre-saved fingerprint template comprises:
calculating a matching degree between each feature point in the current feature point set and the pre-saved fingerprint template; and
determining that the current feature point set is matched with the pre-saved fingerprint template when the number of feature points in the current feature point set whose matching degree is greater than a preset matching degree is greater than a second preset threshold.

9. A mobile terminal, comprising:
a processor, a memory, a communication interface, a fingerprint identification module, and a communication bus; the processor, the memory, and the fingerprint identification module, and the communication interface being coupled and communicating with each other via the communication bus, wherein:
the memory is configured to store executable program codes;
the fingerprint identification module is configured to acquire fingerprint data;
the communication interface is configured for wireless communication; and
the processor is configured to invoke the executable program codes stored in the memory to:
acquire a number of feature points in a current feature point set of a finger of a user, the current feature point set being formed by scanning the finger by the mobile terminal according to a current sensing electrode set, the current sensing electrode set comprising sensing electrodes from the $([M/2]-k11)^{th}$ row to $([M/2]+k12)^{th}$ row in a sensing electrode array with M rows and N columns, the sensing electrode array being arranged in a fingerprint identification module of the mobile terminal, and M, N, k11, and k12 being positive integers;
add X rows of sensing electrodes to the current sensing electrode set to update the current sensing electrode set, when the number of the feature points in the current feature point set is smaller than a first preset threshold;
scan the finger according to sensing electrodes in the current sensing electrode set updated to obtain the fingerprint data;
generate a fingerprint image base on the fingerprint data;
extract feature points from the fingerprint image, and update the current feature point set based on the feature points extracted, the X rows comprising X1 rows preceding and adjacent to the $([M/2]-k11)^{th}$ row and X2 rows next to and adjacent to the $([M/2]+k12)^{th}$ row, with X1, X2, and X being positive integers; and
unlock the mobile terminal when the number of the feature points in the current feature point set is greater than or equal to the first preset threshold and the current feature point set is matched with a pre-saved fingerprint template.

10. The mobile terminal of claim 9, wherein the processor is further configured to invoke the executable program codes stored in the memory to:
acquire n2 underlying data values through n2 normal sensing electrodes in the current sensing electrode set updated, the current sensing electrode set comprising n1 abnormal sensing electrodes and the n2 normal sensing electrodes, and n1 and n2 being positive integers; and
determine n1 reference underlying data values corresponding to the n1 abnormal sensing electrodes according to the n2 underlying data values acquired through the n2 normal sensing electrodes, the n1 reference underlying data values and the n2 underlying data values constituting the fingerprint data.

11. The mobile terminal of claim 10, wherein the processor is further configured to invoke the executable program codes stored in the memory to:
calculate an average value of the n2 underlying data values; and
determine each of the n1 reference underlying data values corresponding to the n1 abnormal sensing electrodes to be the average value.

12. The mobile terminal of claim 10, wherein the processor is further configured to invoke the executable program codes stored in the memory to:
acquire a coordinate value of each of the n1 abnormal sensing electrodes; and
perform a mean processing on each abnormal sensing electrode according to the coordinate value of each abnormal sensing electrode and the n2 underlying data values, to acquire the n1 reference underlying data values corresponding to the n1 abnormal sensing electrodes,
wherein the mean processing comprises:
determining, from among the n2 normal sensing electrodes, x sensing electrodes whose distance to a coordinate value of an abnormal sensing electrode currently subjected to the mean processing is smaller than a preset distance;
calculating an average value of x underlying data values corresponding to the x sensing electrodes; and
determining the average value to be a reference underlying data value of the abnormal sensing electrode currently subjected to the mean processing, with x being a positive integer.

13. The mobile terminal of claim 9, wherein the processor is further configured to invoke the executable program codes stored in the memory to:

calculate a matching degree between each feature point in the current feature point set and the pre-saved fingerprint template; and determine that the current feature point set is matched with the pre-saved fingerprint template when the number of feature points in the current feature point set whose matching degrees is greater than a preset matching degree is greater than a second preset threshold.

14. The mobile terminal of claim 10, wherein the processor is further configured to invoke the executable program codes stored in the memory to:

calculate a matching degree between each feature point in the current feature point set and the pre-saved fingerprint template; and determine that the current feature point set is matched with the pre-saved fingerprint template when the number of feature points in the current feature point set whose matching degrees is greater than a preset matching degree is greater than a second preset threshold.

15. The mobile terminal of claim 11, wherein the processor is further configured to invoke the executable program codes stored in the memory to:

calculate a matching degree between each feature point in the current feature point set and the pre-saved fingerprint template; and determine that the current feature point set is matched with the pre-saved fingerprint template when the number of feature points in the current feature point set whose matching degrees is greater than a preset matching degree is greater than a second preset threshold.

16. The mobile terminal of claim 12, wherein the processor is further configured to invoke the executable program codes stored in the memory to:

calculate a matching degree between each feature point in the current feature point set and the pre-saved fingerprint template; and determine that the current feature point set is matched with the pre-saved fingerprint template when the number of feature points in the current feature point set whose matching degrees is greater than a preset matching degree is greater than a second preset threshold.

17. A non-transitory computer-readable storage medium, comprising executable instructions that, when executed by a processor, are configured to:

acquire a number of feature points in a current feature point set of a finger of a user, the current feature point set being formed by scanning the finger by a mobile terminal according to a current sensing electrode set, the current sensing electrode set comprising sensing electrodes from the $([M/2]-k11)^{th}$ row to $([M/2]+k12)^{th}$ row in a sensing electrode array with M rows and N columns, the sensing electrode array being arranged in a fingerprint identification module of the mobile terminal, and M, N, k11, and k12 being positive integers;

add X rows of sensing electrodes to the current sensing electrode set to update the current sensing electrode set, when the number of the feature points in the current feature point set is smaller than a first preset threshold;

scan the finger according to sensing electrodes in the current sensing electrode set updated to obtain fingerprint data;

generate a fingerprint image base on the fingerprint data;

extract feature points from the fingerprint image, and update the current feature point set based on the feature points extracted, the X rows comprising X1 rows preceding and adjacent to the $([M/2]-k11)^{th}$ row and X2 rows next to and adjacent to the $([M/2]+k12)^{th}$ row, with X1, X2, and X being positive integers; and unlock the mobile terminal when the number of the feature points in the current feature point set is greater than or equal to the first preset threshold and the current feature point set is matched with a pre-saved fingerprint template.

\* \* \* \* \*